(12) United States Patent
Edvardsson et al.

(10) Patent No.: US 10,378,947 B2
(45) Date of Patent: Aug. 13, 2019

(54) RADAR LEVEL GAUGE SYSTEM WITH FEEDING COMPRISING AN ELECTRICAL FILTER

(71) Applicant: Rosemount Tank Radar AB, Mölnlycke (SE)

(72) Inventors: Olov Edvardsson, Linköping (SE); Leif Nilsson, Linköping (SE); Niklas Penndal, Jönköping (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 378 days.

(21) Appl. No.: 15/204,177

(22) Filed: Jul. 7, 2016

(65) Prior Publication Data

US 2018/0010948 A1   Jan. 11, 2018

(51) Int. Cl.
*G01F 23/284* (2006.01)
*G01S 7/03* (2006.01)
*G01S 13/88* (2006.01)

(52) U.S. Cl.
CPC ........... *G01F 23/284* (2013.01); *G01S 7/03* (2013.01); *G01S 13/88* (2013.01)

(58) Field of Classification Search
CPC .................................................. G01F 23/284
USPC ....................................................... 342/124
See application file for complete search history.

(56) References Cited

U.S. PATENT DOCUMENTS 3,277,711 A   10/1966 Roberge
8,531,253 B2   9/2013 Ahn et al.

2004/0100281 A1 * 5/2004 Nilsson ................. G01F 23/284
                                                          324/644
2005/0083229 A1   4/2005 Edvardsson et al.
2007/0020998 A1   1/2007 Edvardsson
2008/0303611 A1   12/2008 Michalski et al.
(Continued)

FOREIGN PATENT DOCUMENTS

GB   793 953   4/1958

OTHER PUBLICATIONS

Notification of Transmittal of the International Search Report and the Written Opinion of the International Searching Authority from PCT/EP2017/064081, dated Sep. 21, 2017.
(Continued)

*Primary Examiner* — Timothy A Brainard
(74) *Attorney, Agent, or Firm* — Westman, Champlin & Koehler, P.A.

(57) ABSTRACT

A radar level gauge system, for determining a filling level of a product in a tank. The radar level gauge system includes a transmission line probe arranged inside the tank; a tank feed-through for mechanically attaching the transmission line probe to a tank wall of the tank through a non-conductive mechanical connection between the transmission line probe and the tank wall, and for providing a conductive electrical connection to the transmission line probe from outside the tank; and a measurement electronics unit arranged outside the tank. The measurement electronics unit includes: a transceiver; an electrical filter circuit having an input coupled to the transceiver and an output coupled to the transmission line probe via the tank feed-through, the electrical filter circuit exhibiting a series capacitance for non-conductively coupling the transceiver to the transmission line probe via the tank feed-through; and processing circuitry for determining the filling level.

12 Claims, 5 Drawing Sheets

(56) References Cited

U.S. PATENT DOCUMENTS

| | | |
|---|---|---|
| 2009/0085794 A1 | 4/2009 | Edvardsson et al. |
| 2012/0206290 A1 | 8/2012 | Wegemann et al. |
| 2015/0253176 A1 | 9/2015 | Jirskog et al. |
| 2016/0146924 A1 | 5/2016 | Williams |

OTHER PUBLICATIONS

AN9003—A User's Guide to Intrinsic Safety, Cooper Crouse-Hinds, retrieved Sep. 25, 2012.

* cited by examiner

US 10,378,947 B2

RADAR LEVEL GAUGE SYSTEM WITH FEEDING COMPRISING AN ELECTRICAL FILTER

TECHNICAL FIELD OF THE INVENTION

The present invention relates to a radar level gauge system and method for determining a filling level of a product in a tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, which is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

The distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems is generally referred to as being of the FMCW (Frequency Modulated Continuous Wave) type.

A radar level gauge system is often mounted on a so-called nozzle at the top of the tank. The nozzle may typically be a pipe that is welded to the tank and fitted with a flange at its upper end to allow attachment of an instrument, such as a radar level gauge system, or a blind flange. In such cases, the probe is typically mechanically connected to the tank at the top of the nozzle, and passes through the nozzle before entering the tank itself. At the top of the nozzle, the probe may be electrically connected to the transceiver of the radar level gauge system through a feed-through that passes through the tank boundary.

It is important that the radar level gauge system is designed and approved to include mandatory explosion protection means, since the transmitted electromagnetic signals may be fed into a tank with flammable and explosive gases and liquids. Such a hazardous environment puts restrictions on how the electromagnetic signals for transmission are formed and fed.

For a GWR system where signal wires are entering the tank a protection system called intrinsic safety is generally to be used. The concept intrinsically safe is defined by relevant norms and means that neither normal signals nor voltages possibly occurring under failure conditions should be capable of causing an ignition, even under worst case conditions. Examples of norms for intrinsic safety are IEC610079-0 and IEC610079-11. Outside tanks but close to them less stringent protection systems may be used.

SUMMARY OF THE INVENTION

In view of the above, a general object of the present invention is to provide an improved radar level gauge system, and in particular a radar level gauge system providing an intrinsically safe connection to the interior of the tank in a cost-efficient manner.

According to a first aspect of the present invention, it is therefore provided a radar level gauge system, for determining a filling level of a product in a tank, the radar level gauge system comprising: a transmission line probe arranged inside the tank for guiding an electromagnetic transmit signal towards a surface of the product, and for returning an electromagnetic surface echo signal resulting from reflection of the transmit signal at the surface; a tank feed-through for mechanically attaching the transmission line probe to a tank wall of the tank through a non-conductive mechanical connection between the transmission line probe and the tank wall, and for providing a conductive electrical connection to the transmission line probe from outside the tank; a measurement electronics unit arranged outside the tank including: a transceiver for generating the transmit signal, transmitting the transmit signal, and receiving the surface echo signal; an electrical filter circuit having an input coupled to the transceiver and an output coupled to the transmission line probe via the tank feed-through for providing the transmit signal from the transceiver to the transmission line probe and the surface echo signal from the transmission line probe to the transceiver, the electrical filter circuit exhibiting a series capacitance for non-conductively coupling the transceiver to the transmission line probe via the tank feed-through; and processing circuitry connected to the transceiver for determining the filling level based on a timing relation between the transmit signal and the surface echo signal.

The measurement electronics unit may be enclosed by a measurement electronics unit housing. A part of the measurement electronics unit housing may advantageously be a so-called flame-proof or explosion-proof enclosure. This basically means that an open flame or explosion inside the housing cannot result in ignition of a flammable substance existing outside the housing. The combination of a flame-proof/explosion-proof measurement electronics unit housing and an intrinsically safe output from the measurement electronics unit housing may be an advantageous way of providing a radar level gauge system that is safe for use in a hazardous environment.

In existing radar level gauge systems, in particular so-called guided wave radar (GWR) systems, intrinsic safety (IS) is generally achieved by providing relatively costly separation components, such as zener barriers etc. The zener barriers are difficult to design sufficient wide-band to let the transmit signal pass undisturbed and more complex solutions are sometimes used.

The present invention is based upon the realization that the requirements for intrinsic safety are lower and more straightforward to test for relatively high frequencies (such as frequencies higher than about 100 MHz) than for relatively low frequencies (including DC), and that an intrinsically safe output from the measurement electronics unit may be significantly easier and less costly to achieve if the measurement electronics unit is provided with an electrical filter circuit with a series capacitance for non-conductive, reactive coupling between the transceiver and the tank feed-through.

Through the non-conductive coupling of the transmit signal, according to embodiments of the present invention, relatively costly separation components (zener barriers etc) may not be needed to fulfill the requirements for IS-approval. This obviously provides for lower development cost and may also provide for a reduced time to market for a newly developed radar level gauge system.

According to various embodiments, a maximum possible voltage that may be present in the measurement electronics unit may be in a first frequency band only including frequencies lower than 100 Hz; the transmit signal may define a second frequency band only including frequencies between 0.5 GHz and 4 GHz; and the electrical filter may be dimensioned in such a way that: an amount of energy in the first frequency band that can be stored by the series capacitance of the electrical filter at the maximum possible voltage is insufficient to ignite an explosive gas; and an attenuation across the second frequency band is less than 3 dB.

For practically all radar level gauge system installations, the maximum possible voltage that may be present in the feeding circuits of the radar level gauge system is 375 V (1.5 times nominal 250 VAC) at 50-60 Hz. In a worst case scenario, this is the voltage that could possibly be present across the series capacitor of the electrical filter circuit in the radar level gauge system according to embodiments of the present invention. Various protection circuits can be used to avoid high voltages to reach hazardous areas under fault conditions and the present invention with an infallible capacitive coupling can replace or simplify other protection means. By keeping the series capacitance of the electrical filter circuit below 100 pF it can be ensured that there cannot be sufficient energy at the output of the electrical filter circuit to ignite a flammable gas, even in the worst case scenario. It is well known that about 20 µJ is a safe lower energy limit near, but not capable to ignite a hydrogen/air mixture with 22% hydrogen gas. This gas mixture has been found to be the easiest to ignite with a spark. A capacitor of 100 pF charged to 375 V (nominally 250 V with the conventional safety factor 1.5 used in intrinsic safety) will store nearly 20 µJ.

Depending on the bandwidth of the second frequency band, it may be possible to achieve the desired filter function with an electrical filter only comprising a suitable coupling capacitor having a capacitance of less than about 100 pF. To provide for a less frequency dependent filter function, it may, however, be advantageous to provide the electrical filter with an inductance in series with the series capacitance. The inductances for filters in the GHz-range will be in the range of 10 nH which can be made of short printed lines. The inductances are used to make the filter pass-band smooth but have no influence on the safety function. From conventional filter design the filter may take many shapes in which the series capacitor can be used as a protection component. An inductance connected serially with the protection capacitor is a first step and this combination as a part of a pi-filter is a further improvement to improve bandwidth and filter transmission smoothness. Instead of a pi-filter similar components used in a T-filter can be used and further improvements are well known in the art.

According to various embodiments, furthermore, the electrical filter may be configured to attenuate the transmit signal with an attenuation that increases by at least 6 dB per octave with decreasing frequency of the transmit signal for frequencies below the second frequency band.

It may be possible to achieve the desired filter function with an electrical filter only comprising a suitable coupling capacitor having a capacitance of less than 10 pF.

To further facilitate IS-approval of the radar level gauge system, the electrical filter comprised in the feeding circuitry may advantageously be designed to provide so-called infallible separation, so that the electrical filter fulfills the requirements of a non-connection in the standards related to intrinsic safety. At least one capacitor here is used as a separation component for intrinsic safety and if it is made infallible in the sense of applicable norms for intrinsic safety, only one capacitor needs to be used instead of three coupled serially.

According to embodiments, the electrical filter circuit may comprise a dielectric structure; the series capacitance may be at least partly provided by a series capacitor comprising a first capacitor electrode connected to the transceiver, a second capacitor electrode connected to the tank feed-through, and a portion of the dielectric structure provided between the first capacitor electrode and the second capacitor electrode; and the first capacitor electrode and the second capacitor electrode may be separated by a distance sufficient for providing infallible separation for the above-mentioned maximum possible voltage.

Many electric systems in industrial applications are used in areas where explosive gases or highly flammable products normally occur. Oil refineries, storage plants for petroleum products and most chemical plants are obvious examples. Fire or explosion in the wrong place could cause a disaster and most countries have since several decades or more made it mandatory for all users (companies etc.) to fulfill a number of laws/rules to strongly decrease the possibility of such a calamity. Depending on application a few different degrees of protection are standardized as minimum and for electrical measuring or monitoring devices the protection method "intrinsic safety" is generally used. Component development has made such units working at much lower power than used in older instruments which simplifies protection. Intrinsic safety means that only very low power (incl. low voltage and current) is allowed to enter hazardous areas and suitable authorities can after investigation and tests verify that a certain equipment fulfill requirements for intrinsic safety and in that case units manufactured like the tested units are legally allowed to carry corresponding marking (explicit telling intrinsically safe and containing certain specified data including relevant identification). The rules apply both to circuits located in hazardous area and circuits used to feed power and signals to parts located in hazardous area. In the full system there is a border between circuits allowed to be in hazardous area as "intrinsic safe units" and connection circuits (called "associated intrinsically safe units") necessary to create the safety conditions but which are not allowed to be in the hazardous area. Very roughly, intrinsic safety means that maximum values around 20V/50 mA are allowed to enter hazardous areas so only low power devices can be classified as intrinsic safe. Expressed in another way spark energies below 20 µJ have been found to be unable to cause ignition of any air/hydrogen mixture even under the worst combination of parameters. Of all flammable substances hydrogen is most easy to ignite by a spark. Arbitrary short circuits or broken wires in an intrinsically safe equipment located in a hazardous area cannot cause any ignition even under worst parameter combinations and that must be valid even if one or two "faults" in the circuits are present.

Examples of rules are IEC60079-0 (general for explosion protection of several methods) and IEC60079-11 (rules specific for intrinsic safety). Many national rules (like Factory Mutual and Underwriters in USA, CSA in Canada etc.) exist for intrinsic safety but all basic concepts are the same even if minor details may differ. The ability to create igniting sparks is tested with the same test equipment based on research carried out during the last 50 years and a mixture of hydrogen/air is used as that gas mixture because among flammable gases and liquids it is most easy to be ignited by a spark. To maintain safety function (if not necessarily normal desired function) under one or two faults critical components are triplicated (like three capacitors connected serially to maintain DC insulation even after two short-circuited capacitors) and the three following types of fault are defined in all norms for intrinsic safety. Practical examples in the table below are from table 5 in IEC60079-11 and apply to separation needed between intrinsically safe circuits and circuits carrying mains power (220-250 V 50/60 Hz with peak values below 375V) or similar voltages:

| Classification of fault possibility below: | Minimum insulation distance for separation between intrinsically safe circuits and circuits containing up to 375 V peak. | | |
|---|---|---|---|
| | Over PCB-surface without coating | Over coated PCB surface | Through solid dielectric material |
| Infallible if distance bigger than | >10 mm | >3.3 mm | >1 mm |
| Countable fault if distance bigger than | >3.3 mm | >1.1 mm | >0.33 mm |
| Uncountable fault if closer than | <3.3 mm | <1.1 mm | <0.33 mm |

One or two "countable faults" in the circuit under test are included in the worst case test but for uncountable faults any number or combination of such faults are used within what is considered as "normal function" with regard to safety. "Infallible" means that the insulation is considered to remain in any case. The distances above may be slightly different in different norms and different applications but the terms (infallible etc.) are the same. For many other components the same three classifications (infallible etc.) apply but the criteria are more complicated than above and may include test procedures and design details for good quality. Any change in future production (changed component etc.) needs a formal approval for intrinsically safe equipment.

In these embodiments, infallible separation between the first capacitor electrode and the second capacitor electrode may advantageously be achieved through proper arrangement of the first and second capacitor electrodes and the dielectric structure between the first and second capacitor electrodes.

There are many ways of realizing the coupling capacitor using the principle of these embodiments. For instance, the first and second capacitor electrodes may be provided as parallel plates separated by the dielectric structure, of the first and second capacitor electrodes may be provided as planar structures spaced apart in the same plane. According to other implementations, the first and second capacitor electrodes may be provided as parallel conductors, or as a coaxial structure.

Various examples of coupling capacitor structures utilizing a dielectric structure, albeit in a different context and for a different purpose, are described in US 2007/0020998, which is hereby incorporated by reference in its entirety.

In embodiments, the dielectric structure may be a circuit board, which may be made of a suitable commercially available printed circuit board material. In other embodiments, the dielectric structure may be a portion of the measurement electronics unit housing. In any case, the first capacitor electrode and the second capacitor electrode may be separated by a sufficient distance, to provide for infallible separation, which allows the output of the feeding circuitry to fulfill the requirements on intrinsic safety without the need for redundant components and/or safety circuitry (zener barriers etc).

According to other embodiments, the series capacitance of the electrical filter circuit may be realized using a surface mounted capacitor component. Infallible separation may be achieved by ensuring a sufficient distance trough a solid dielectric between the first connection pad and the second connection pad of a surface mounted capacitor component. For instance, the distance between the connection pads may be at least 0.8 mm, and the capacitor component may be coated with a dielectric surface coating.

The transmission line probe may advantageously be a single conductor probe (sometimes referred to as a Goubau probe or Goubau line), which may be rigid or flexible/pliable. Such single conductor transmission line probes are advantageous for various filling level determination applications, since these probes are relatively robust and insensitive to interaction with the product in the tank.

In embodiments, the transmission line probe may advantageously be grounded, that is, conductively connected to electrical ground at least for low frequency signals, including DC.

Grounding the probe may make the radar level gauge system considerably more tolerant to external disturbances, such as various EMC-disturbances and induced voltages from a lightning in the neighborhood. This is particularly the case for installation in a plastic tank.

The transmission line probe may advantageously be grounded via an inductor, to provide grounding at the desired frequencies below the frequency band of the transmit signal used for level gauging. The inductor may be comprised in the electrical filter of the feeding circuitry. Accordingly, the transmission line probe, and the output terminal of the coupling capacitor of the electrical filter, may be connected to ground via a suitable inductor. For a filter bandwidth like 1-2 GHz the inductance will be in the order of 10 nH which may, for example, be realized by a piece of line a few cm long and easily located on a circuit board.

According to various embodiments, furthermore, the transceiver may comprise transmit signal generating circuitry for generating the transmit signal as a signal having a time-varying transmit signal frequency; and a mixer connected to the transmit signal generating circuitry and to the propagation device, via the feeding circuitry, for mixing the transmit signal and the surface echo signal to form an intermediate frequency signal. The processing circuitry may be configured to determine the filling level based on the intermediate frequency signal.

Accordingly, the radar level gauge system may be a frequency-modulated continuous wave (FMCW) level gauge system, wherein the transceiver may be configured to transmit the electromagnetic signal in a frequency band above 0.5 GHz and below 4 GHz, such as e.g. between 1 and 2 GHz.

According to various embodiments, at least the transmit signal generating circuitry and the mixer may be comprised in an integrated microwave circuit.

An integrated microwave circuit should, in the context of the present application, be understood to mean a type of monolithic (single die) integrated circuit (IC) device that operates at microwave frequencies (such as about 300 MHz to about 300 GHz).

An integrated microwave circuit is often referred to as an MMIC (Monolithic Microwave Integrated Circuit).

MMICs may, for example, be fabricated using Si, SiGe, or a III-V compound semiconductor such as GaAs or InP.

The integrated microwave circuit may advantageously be comprised in a multi chip module together with one or several other integrated circuits to provide more functionality to a single electronic component (defined by a single electronic component package).

The use of an integrated microwave circuit contributes to a significantly reduced cost of the radar level gauge system according to various embodiments of the present invention.

According to various embodiments, the mixer may be provided in the form of any circuitry capable of combining the transmit signal and the reflection signal in such a way that an intermediate frequency signal is formed that is indicative of the phase difference between the transmit signal and the reflection signal.

One example of a simple and compact mixer is the so-called single diode leaky mixer.

In various embodiments, the electromagnetic transmit signal may have substantially constant amplitude. The power of the transmit signal may be in the range of −50 dBm to +5 dBm, typically 0 dBm, i e 1 mW.

Tests and theoretical calculations show that a sweep duration of about 10 ms should be sufficiently short to fulfill the energy/power consumption criteria for a two-wire current loop system, which is currently seen as the most challenging application.

In various embodiments of the radar level gauge system, the microwave signal source controller may be configured to control the microwave signal source to generate the measurement sweep having a time duration of less than 5 ms.

This may provide for even lower energy consumption because of a shorter on-time of the microwave signal source.

Moreover, the radar level gauge system according to various embodiments of the present invention may further comprise a sampler coupled to the mixer and configured to sample the intermediate frequency signal at less than 500 sampling times during the measurement sweep.

This provides for a further reduction in the energy consumption of the radar level gauge system, because the time used for processing the intermediate frequency signal can be reduced.

According to a second aspect of the present invention, there is provided a method of determining a filling level of a product contained in a tank using a radar level gauge system comprising a measurement electronics unit arranged outside the tank and a transmission line probe arranged inside the tank, comprising the steps of: generating an electromagnetic transmit signal using a transceiver comprised in the measurement electronics unit; non-conductively passing the transmit signal through an electrical filter exhibiting a series capacitance, between the transceiver and the propagation device to provide a filtered transmit signal; guiding, by the transmission line probe, the filtered transmit signal towards a surface of the product; guiding, by the transmission line probe, a surface echo signal resulting from reflection of the filtered transmit signal at the surface back towards the transceiver; non-conductively providing the surface echo signal to the transceiver through the electrical filter; and determining, using processing circuitry comprised in the measurement electronics unit, the filling level based on the transmit signal and the surface echo signal.

Further embodiments of, and effects obtained through this second aspect of the present invention are largely analogous to those described above for the first aspect of the invention.

In summary, the present invention thus relates to a radar level gauge system, for determining a filling level of a product in a tank. The radar level gauge system includes a transmission line probe arranged inside the tank; a tank feed-through for mechanically attaching the transmission line probe to a tank wall of the tank through a non-conductive mechanical connection between the transmission line probe and the tank wall, and for providing a conductive electrical connection to the transmission line probe from outside the tank; and a measurement electronics unit arranged outside the tank. The measurement electronics unit includes: a transceiver; an electrical filter circuit having an input coupled to the transceiver and an output coupled to the transmission line probe via the tank feed-through, the electrical filter circuit exhibiting a series capacitance for non-conductively coupling the transceiver to the transmission line probe via the tank feed-through; and processing circuitry for determining the filling level.

BRIEF DESCRIPTION OF THE DRAWINGS

These and other aspects of the present invention will now be described in more detail, with reference to the appended drawings showing embodiments of the invention, wherein:

FIG. 1b is a schematic illustration of the measurement electronics unit comprised in the radar level gauge system in FIG. 1a;

DETAILED DESCRIPTION OF EXAMPLE EMBODIMENTS OF THE INVENTION

Figure 1A:
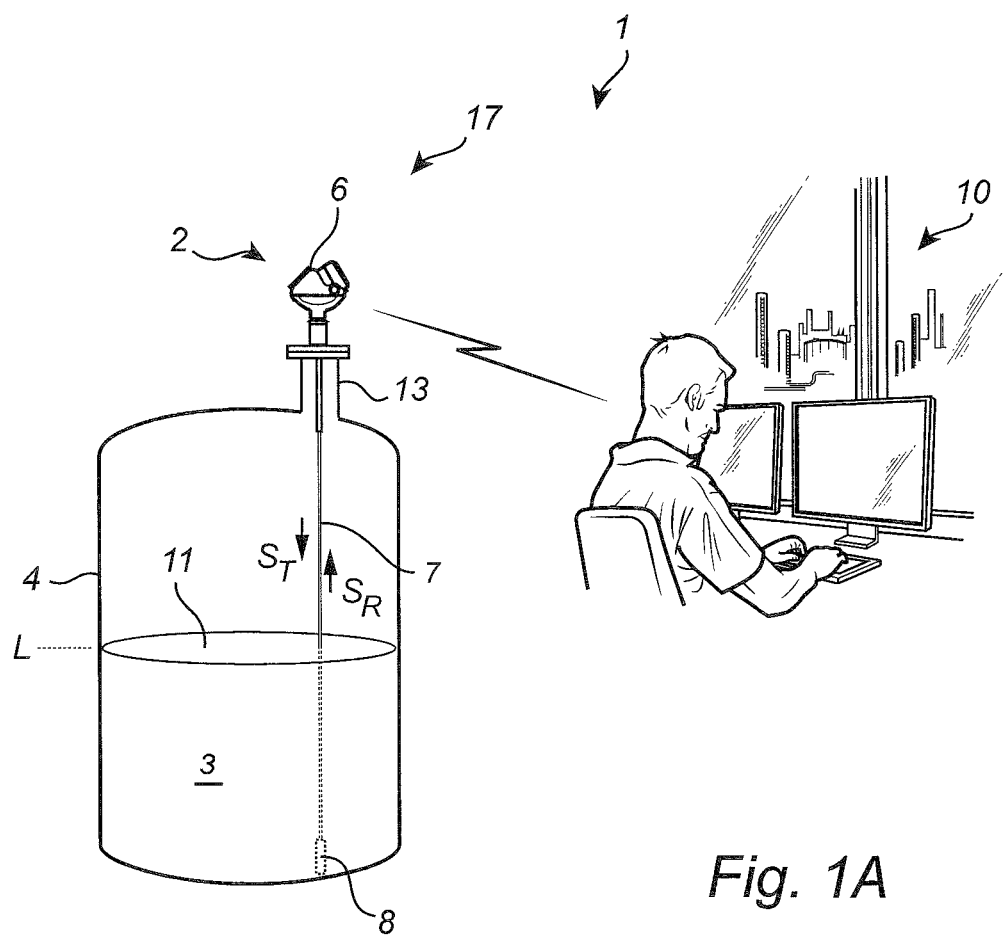
FIG. 1a schematically illustrates an exemplary tank arrangement comprising a radar level gauge system according to an embodiment of the present invention.

FIG. 1a schematically shows a level measuring system 1 comprising a tank arrangement 17 according to an example embodiment of the present invention, and a host system 10 illustrated as a control room.

The tank arrangement 17 comprises a radar level gauge 2 of GWR (Guided Wave Radar) type and a tank 4 having a tubular mounting structure 13 (often referred to as a "nozzle") extending substantially vertically from the roof of the tank 4.

The radar level gauge 2 is installed to measure the filling level of a product 3 contained in the tank 4. The radar level gauge 2 comprises a measuring electronics unit 6 arranged outside the tank 4, and a propagation device, here in the form of a single conductor probe 7, extending from the measuring unit 6, through the tubular mounting structure 13, towards and into the product 3. In the example embodiment in FIG. 1, the single conductor probe 7 is a wire probe, that has a weight 8 attached at the end thereof to keep the wire straight and vertical.

By analyzing transmitted signals $S_T$ being guided by the probe 7 towards the surface 11 of the product 3, and reflected signals $S_R$ traveling back from the surface 11, the measurement unit 6 can determine the distance between a reference position (such as a feed-through between the outside and the inside of the tank) and the surface 11 of the product 3, whereby the filling level can be deduced. It should be noted that, although a tank 4 containing a single product 3 is discussed herein, the distance to any material interface along the probe can be measured in a similar manner.

Figure 1B:
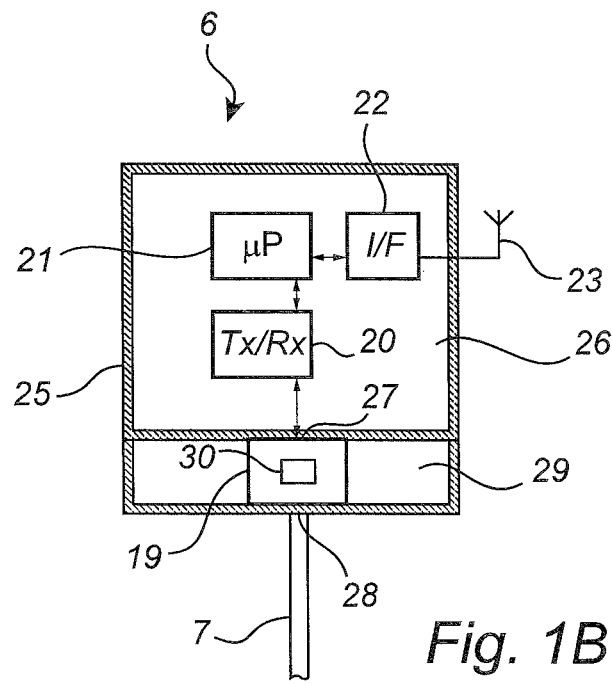

As is schematically illustrated in FIG. 1b, the measurement electronics unit 6 comprises a transceiver 20, feeding circuitry 19, processing circuitry 21, a communication interface 22, and a communication antenna 23 for wireless communication with the control room 10. The transceiver 20, the feeding circuitry 19, the processing circuitry 21, and the communication interface 22 are all enclosed in a measurement electronics unit housing 25 defining a first space 26 containing the transceiver 20, the processing circuitry 21, and the communication interface 22, and a second space 29 containing the feeding circuitry 19. Only the first space 26 is inside an explosion proof (sometimes also referred to as flame proof) barrier. The second space 29 is not explosion proof. The explosion proof barrier may need to fulfill certain requirements, such as those detailed by international standard IEC 60079-1 or similar standards.

The transceiver 20 is configured to generate, transmit and receive electromagnetic signals. The feeding circuitry 19 is electrically connected to the transceiver at a feeding circuitry input 27, and electrically connected to the probe 7 at a feeding circuitry output 28 which is accessible from the outside of the measurement electronics unit housing 25. When the radar level gauge system 17 is in operation, the feeding circuitry 19 provides the transmit signal $S_T$ from the transceiver 20 to the probe 7, and returns the surface echo signal $S_R$ from the probe 7 to the transceiver 20. As will be described in greater detail further below, the feeding circuitry 19 comprises an electrical filter 30 configured to suppress electromagnetic signals with frequencies lower than a few hundred MHz.

The processing circuitry 21 is connected to the transceiver 20 and configured to determine the filling level L of the product 3 based on the transmit signal $S_T$ and the surface echo signal $S_R$ being a reflection of the transmit signal at the surface 11 of the product 3. The communication interface 22 is connected to the processing circuitry 21 and configured to allow communicating with the host system 10 via the communication antenna 23. In the example embodiment of FIGS. 1a-b, the communication between the radar level gauge 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

Moreover, although not shown in FIG. 1b, the radar level gauge 2 may be connectable to an external power source, or may be powered through communication lines.

A first example configuration of the electrical filter 30 will now be described with reference to FIG. 2, FIGS. 3a-c and FIG. 4.

Figure 2:
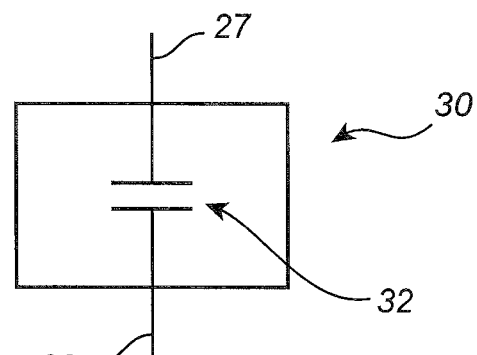
FIG. 2 is a schematic illustration of the electrical filter included in the feeding circuitry of a first embodiment of the radar level gauge system in FIGS. 1a-b.

In the first simple example electrical filter configuration schematically illustrated in FIG. 2, the electrical filter 30 comprises a coupling capacitor 32 having a capacitance of less than 10 pF. Due to the low capacitance, the coupling capacitor 32 will effectively suppress low frequency electrical signals from passing from the input 27 to the output 28 of the feeding circuitry 19. Through the suppression of low frequency energy by the electrical filter 30 in the feeding circuitry 19, intrinsic safety at the output 28 can be ensured merely by keeping the amplitude of the microwave signal under control. In other words, the provision of the electrical filter 30 ensures that the possible low frequency signals at the output 28 will not be capable of igniting a flammable substance that may come into contact with the output 28 when the radar level gauge system 17 is installed at the tank 4 and in operation. The high frequency signals passing the electrical filter 30 must of course be power limited and must comply with the rules related to intrinsic safety (IS).

Electrical circuits which are to be used close to or inside tanks (or some other area) with explosive liquids or gases must fulfill requirements for intrinsic safety which is the most stringent requirement to avoid ignition. At possible short-circuits or breakings of wires carrying current, sparks can occur. But by limiting voltages and currents, the sparks will be too weak to cause ignition. "Intrinsic safety" is accomplished by following a set of design rules (and formal testing leading to certification of the design) to guarantee such a limitation. IEC60079-0 and IEC60079-11 are applicable as one example of rules but rules and approvals can be slightly different in different countries. The inability to create sparks must be maintained even in the case of one of two faults in the circuits. The above-mentioned rules describe examples of faults, as well as conditions which are "infallible" (when it is considered that faults cannot occur). If two conductors are well separated (the required distance between the conductors depends on if they are separated by air or a solid dielectric material), they are considered as infallible with respect to short circuit between them. If they are a bit closer to each other, short-circuit may be a possible failure and if they are still closer to each other, a short circuit is not even counted as a fault but assumed to occur. All rules for intrinsic safety use the concept infallible and countable faults (i.e 1 or 2 faults should be taken into account) but the details may be slightly different.

To fulfill the requirements of relevant standards and norms, such as those mentioned further above, and to even obviate the requirement for certification testing etc, the electrical filter 30 may thus advantageously be configured so that the probability of potentially dangerous fault modes can be considered to be so low that they need not be taken into account. In various standards (such as the above-mentioned international standard for equipment protection by intrinsic safety IEC 60079-11), such a configuration is, as was also mentioned above, referred to as being infallible. In other words, the suppression function of the filter 30 may depend on an infallible design. Different ways of providing coupling capacitor 32 configurations with infallible separations (cannot be subject to short circuits) will now be described with reference to FIGS. 3a-c.

The above-mentioned IEC 60079-11, which is hereby incorporated by reference in its entirety, specifies various requirements for infallible electrical separation. The present inventor has realized that the electrical filter 30 can be designed with these requirements in mind, and that this may provide for a radar level gauge system 17 that fulfills the requirements in respect of intrinsic safety and that barrier components, extensive testing etc can be dispensed with, which provides for a cost reduction and a decreased development time for new radar level gauge systems 17.

Figures 3A, 3B:
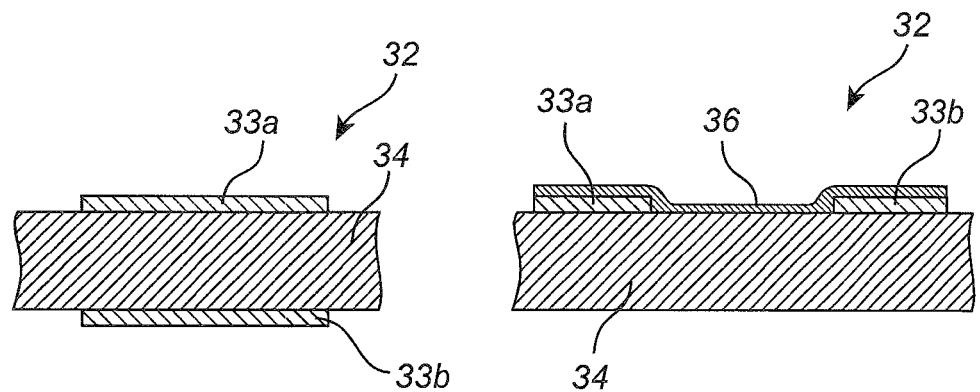
FIGS. 3a-c are schematic illustrations of different implementations of the electrical filter in FIG. 2.

Referring first to FIG. 3*a*, the coupling capacitor 32 comprises a first capacitor electrode 33*a* connected to the transceiver 20 via the input 27 of the feeding circuitry 19, a second capacitor electrode 33*b* connected to the probe 7 via the output 28 of the feeding circuitry, and a dielectric structure 34 of the feeding circuitry arranged between the first 33*a* and second 33*b* capacitor electrodes. The dielectric structure 34 may, for example, be a circuit board or a portion of the measurement electronics unit housing 25. The thickness of the dielectric structure 34 needed for being considered to be infallible will depend on the supply voltage and can be obtained from the above-mentioned IEC 60079-11 or corresponding standards well known to one of ordinary skill in the art. According to the current version of IEC 60079-11, a solid dielectric structure 34 that is at least about 1 mm thick would be sufficient for infallible separation in a system with a maximum 375 V voltage peak in the supply voltage under any condition. 1 mm is an example in order to obtain infallible function according to the use and applicable norm for intrinsic safety. The first 33*a* and the second 33*b* capacitor electrodes should be dimensioned to achieve the desired capacitance of less than 10 pF. The dimensions of the first 33*a* and second 33*b* capacitor electrodes is mainly dependent on the thickness and permittivity of the dielectric structure 34, and the dimensioning will be straight-forward for one of ordinary skill in the art.

A second example configuration of the coupling capacitor 32 for infallible separation will now be described with reference to FIG. 3*b*. In FIG. 3*b*, the first 33*a* and second 33*b* capacitor electrodes are provided on the same side of the dielectric structure 34, and the capacitor electrodes 33*a*-*b* and the dielectric structure 34, at least between the capacitor electrodes 33*a*-*b*, are covered by a dielectric insulation coating 35. In this configuration, and for the same maximum supply voltage as for the configuration in FIG. 3*a*, the distance between the first 33*a* and second 33*b* capacitor electrodes should be at least 3.3 mm to provide infallible separation. Without the dielectric insulation coating 35, the distance should be at least 10 mm. Again, the dimensioning of the first 33*a* and second 33*b* capacitor electrodes for achieving the desired coupling capacitance will be straight-forward for one of ordinary skill in the art.

Figure 3C:
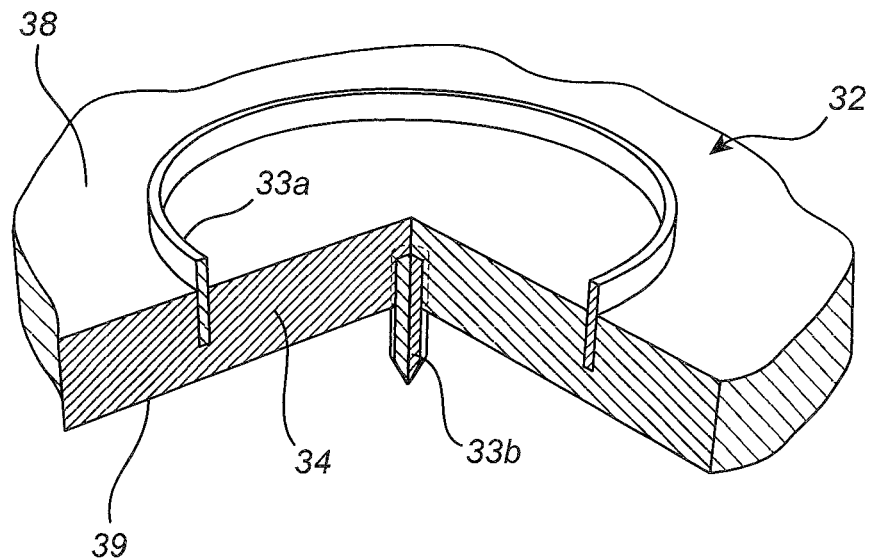

A third example configuration of the coupling capacitor 32 for infallible separation will now be described with reference to FIG. 3*c*. In FIG. 3*c*, the first 33*a* and second 33*b* capacitor electrodes are arranged in a partial coaxial configuration in the dielectric structure 34, with the first capacitor electrode 33*a* being accessible from a first side 38 of the dielectric structure 34, and the second capacitor electrode 33*b* being accessible from a second side 39 of the dielectric structure 34. In this example configuration, the dielectric structure may, for example, be a portion of the measurement electronics unit housing 25, so that the first capacitor electrode 33*a* is accessible from the interior of the housing 25 and the second capacitor electrode 33*b* is accessible from the exterior of the housing 25.

This is accomplished with a filter structure including at least one serial capacitor of such a small value (<10 pF) that all low frequencies (such as 50-60 Hz power at 375 V peak voltage) will be effectively suppressed to levels which can never ignite potentially explosive gases inside the tank. The conventional design is a galvanic connection where other means must be used to stop the potentially hazardous voltages.

With the simple electrical filter 30 provided by the small capacitance coupling capacitor 32, high frequency signals (such as 1 GHz) can pass, while low frequency signals meet a non-connection. For instance 250 VAC at 50-60 Hz would cause less than 1 µA through 5 pF while at least around 10 mA would be required for ignition of hydrogen/air mixture. Accordingly, even the simple electrical filter in FIG. 2 can provide for intrinsic safety at the output of the measurement electronics unit 6. With coupling capacitor configurations such as those described above with reference to FIGS. 3*a*-*c*, the electrical low-frequency separation can be made infallible, which obviates the need for component duplication (or triplication) and/or expensive and bulky barrier components.

Although it would be possible to design a radar level gauge system 17 with feeding circuitry 19 comprising the simple electrical filter in FIG. 2, it would be desirable to provide for a more "flat" frequency dependence, at least for frequencies in the bandwidth defined by the transmit signal $S_T$.

Figure 4:
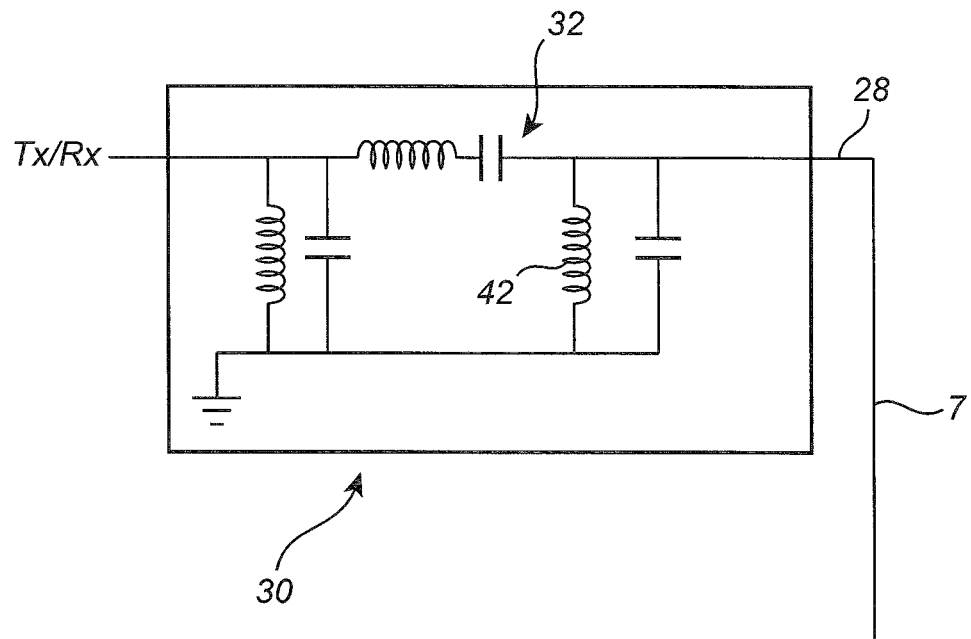
FIG. 4 is a schematic illustration of the electrical filter included in the feeding circuitry of a second embodiment of the radar level gauge system in FIGS. 1a-b.

In the second example electrical filter configuration schematically illustrated in FIG. 4, the electrical filter 30 comprises the above-described coupling capacitor 32 having a capacitance of less than 10 pF, together with further inductances and capacitances in a per se well-known π-net filter. With a suitable filter design, the electrical filter 30 in FIG. 4 can be tuned to provide a substantially flat frequency dependence within a desired frequency band, that may, for example be suitable for, per se well-known, FMCW radar level gauging.

It should be noted that the electrical filter 30 in FIG. 4 provides electrical grounding of the probe 7 through inductor 42. As mentioned further above, this provides for improved suppression of disturbance signals that may be picked up by the probe 7, in particular if a plastic tank 4 is used. The grounding of the probe 7 may also be effective for reducing the risk of lighting induced damage to the radar level gauge system 17.

FIG. 4 shows a pi-filter geometry as one example. A T-structure with two series resonant circuit and one parallel resonant circuit to earth will have a similar function and more complicated filter structures are known. The ground connection goes to the tank and to the feeding circuits but the grounding to the electronics may pass a big capacitor to avoid undesired low frequency grounding of signal connections. The grounding to the tank is a part in the grounding of the probe.

Figure 5:
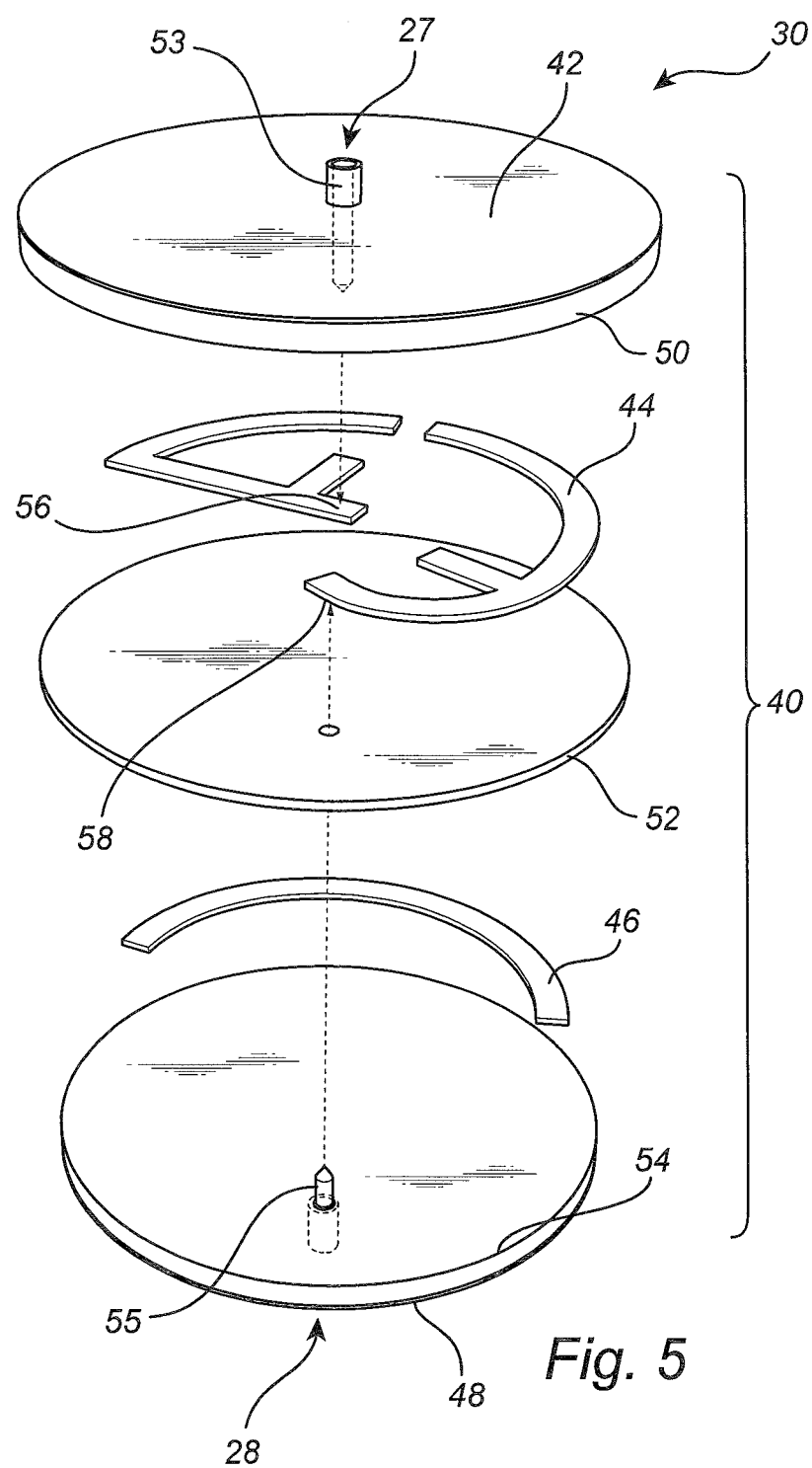
FIG. 5 is a schematic illustration of an example implementation of the electrical filter in FIG. 4.

Like the simple electrical filter in FIG. 2, the more advanced electrical filter in FIG. 4 may be realized in an infallible configuration. One example of such an implementation will now be described with reference to FIG. 5. Referring to the exploded view in FIG. 5, the electrical filter 30 is implemented as a circular multi-layer circuit board 40. In FIG. 5, the electrical filter 30 is implemented as a so-called "broadside coupled" hairpin filter. It should, however, be noted that the circuit board implementation of FIG. 5 or equivalent may equally well be realized as a circuit board with a different outline or as an integral part of a circuit board that includes additional functionality. For example, it will be straight-forward to one of ordinary skill in the art to achieve the desired characteristics of the electrical filter 30 with other conductor patterns and/or different dimensions.

Referring to FIG. 5, the multi-layer circuit board 40 comprises a first conductor layer 42, a second conductor layer 44, a third conductor layer 46, and a fourth conductor layer 48. The first 42 and second 44 conductor layers are separated by a first dielectric layer 50, the second 44 and third 46 conductor layers are separated by a second dielectric layer 52, and the third 46 and fourth 48 conductor layers are separated by a third dielectric layer 54. As is schematically shown in FIG. 5, the first conductor layer 42 covers almost all of a top side of the multi-layer circuit board 40, and the fourth conductor layer 48 covers almost all of a bottom side of the multi-layer circuit board 40. The first conductor layer 42 and the fourth conductor layer 48 function as ground planes. The second conductor layer 44, the third conductor layer 46, and the second dielectric layer 52 together provide the filter functionality according to the circuit diagram in FIG. 4. The input 27 of the electrical filter 30 is here realized as a conductive pin 53 connected to the second conductor layer 44 at an input location 56, and the output 28 of the electrical filter 30 is here realized as a conductive pin 55 connected to the second conductor layer 44 at an output location 58.

In the example implementation of the electrical filter provided by the multi-layer circuit board 40 in FIG. 5, the infallible separation between the input 27 and the output 28 is provided by the second dielectric layer 52 separating the second conductor layer 44 from the third conductor layer 46. The third conductor layer 46 can be seen as a kind of halfwave-resonator with a small capacitor in each end sufficient to create a filter pass-band. The relevant requirements for an infallible or fail-safe separation as provided by norms such as those mentioned herein will determine desirable properties of the second dielectric layer 52. As a non-limiting example, the second dielectric layer 52 may be a dielectric substrate that is at least about 0.2 mm thick. According to one example, the second dielectric layer may be a laminate substrate with a thickness of about 0.5 mm and a relative dielectric constant of about 3.7.

Figure 6:
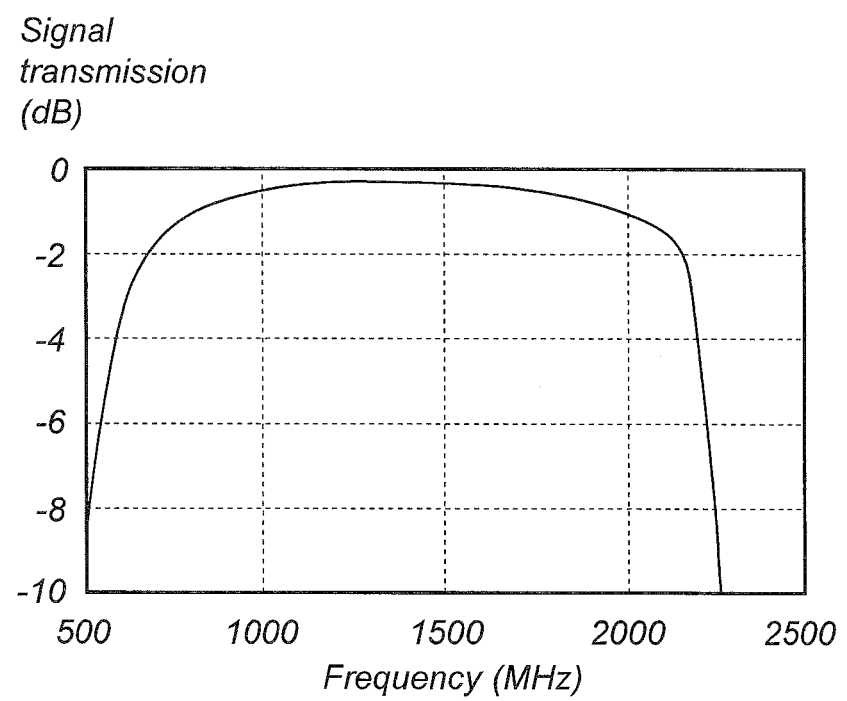
FIG. 6 is a diagram illustrating the signal transmission as a function of frequency for the electrical filter in FIG. 4.

A simulation performed for a filter design implemented using the multi-layer circuit board 40 schematically shown in FIG. 5 resulted in the signal transmission (from the input 27 to the output 28) in dB as a function of frequency shown in FIG. 6. For the simulation in FIG. 6, each of the first dielectric layer 50 and the third dielectric layer 54 was a 3.175 mm thick laminate with a relative dielectric constant of about 2.5. The second dielectric layer was a laminate with a thickness of 0.508 mm and a relative dielectric constant of about 3.7.

The person skilled in the art realizes that the present invention by no means is limited to the preferred embodiments described above. On the contrary, many modifications and variations are possible within the scope of the appended claims.

What is claimed is:

1. A radar level gauge system, for determining a filling level of a product in a tank, said radar level gauge system comprising:
   a transmission line probe arranged inside said tank for guiding an electromagnetic transmit signal towards a surface of said product, and for returning an electromagnetic surface echo signal resulting from reflection of said transmit signal at said surface;
   a tank feed-through for mechanically attaching said transmission line probe to a tank wall of said tank through a non-conductive mechanical connection between said transmission line probe and said tank wall, and for providing a conductive electrical connection to said transmission line probe from outside said tank;
   a measurement electronics unit arranged outside said tank including:
      a transceiver arranged outside said tank for generating said transmit signal, transmitting said transmit signal, and receiving said surface echo signal;
      an electrical filter circuit arranged outside said tank, said electric filter circuit having an input coupled to said transceiver and an output coupled to said transmission line probe via said tank feed-through for providing said transmit signal from said transceiver to said transmission line probe and said surface echo signal from said transmission line probe to said transceiver, said electrical filter circuit exhibiting a series capacitance for non-conductively coupling said transceiver to said transmission line probe via said tank feed-through; and
      processing circuitry arranged outside said tank and connected to said transceiver for determining said filling level based on a timing relation between said transmit signal and said surface echo signal,
   wherein:
      a maximum possible voltage that may be present in said measurement electronics unit is at least 100 V and less than 375 V, and exhibits an AC frequency in a first frequency band only including frequencies lower than 100 Hz; and
      said electrical filter circuit is dimensioned in such a way that an amount of energy in said first frequency band that can be stored by the series capacitance of said electrical filter at said maximum possible voltage is insufficient to ignite a hydrogen/air mixture with 22% hydrogen gas.

2. The radar level gauge system according to claim 1, wherein:
   said transmit signal defines a second frequency band only including frequencies higher than 0.5 GHz and lower than 4 GHz; and
   said electrical filter circuit is dimensioned in such a way that an attenuation across said second frequency band is less than 3 dB.

3. The radar level gauge system according to claim 1, wherein said electrical filter comprises an inductance in series with said series capacitance.

4. The radar level gauge system according to claim 1, wherein said series capacitance is less than 100 pF.

5. The radar level gauge system according to claim 1, wherein said series capacitance of said electrical filter is at least partly provided as a capacitor component surface mounted on a circuit board.

6. The radar level gauge system according to claim 5, wherein said capacitor component is coated by a dielectric surface coating being electrically insulating.

7. The radar level gauge system according to claim 6, wherein said dielectric surface coating has been applied after said capacitor component has been surface mounted on said circuit board.

8. The radar level gauge system according to claim 1, wherein said transmission line probe is a single conductor probe.

9. The radar level gauge system according to claim 1, wherein said transmission line probe is grounded.

10. The radar level gauge system according to claim 9, wherein said transmission line probe is grounded via an inductance comprised in said electrical filter.

11. The radar level gauge system according to claim 1, wherein said transceiver comprises:
    transmit signal generating circuitry for generating said transmit signal as a signal having a time-varying transmit signal frequency; and
    a mixer connected to said transmit signal generating circuitry and to said propagation device, via said feeding circuitry, for mixing said transmit signal and said surface echo signal to form an intermediate frequency signal.

12. A method of determining a filling level of a product contained in a tank using a radar level gauge system comprising a measurement electronics unit arranged outside said tank and a transmission line probe arranged inside said tank, comprising the steps of:
    generating an electromagnetic transmit signal using a transceiver comprised in said measurement electronics unit;
    non-conductively passing said transmit signal through an electrical filter exhibiting a series capacitance, between said transceiver and said propagation device to provide a filtered transmit signal;
    guiding, by said transmission line probe, said filtered transmit signal towards a surface of said product;
    guiding, by said transmission line probe, a surface echo signal resulting from reflection of said filtered transmit signal at said surface back towards said transceiver;
    non-conductively providing said surface echo signal to said transceiver through said electrical filter; and
    determining, using processing circuitry comprised in said measurement electronics unit, said filling level based on said transmit signal and said surface echo signal.

* * * * *